April 11, 1950  J. LE VALLEY  2,503,397
PRESSURE FLUID FOLLOW-UP SERVOMOTOR
Filed June 19, 1945  3 Sheets-Sheet 1
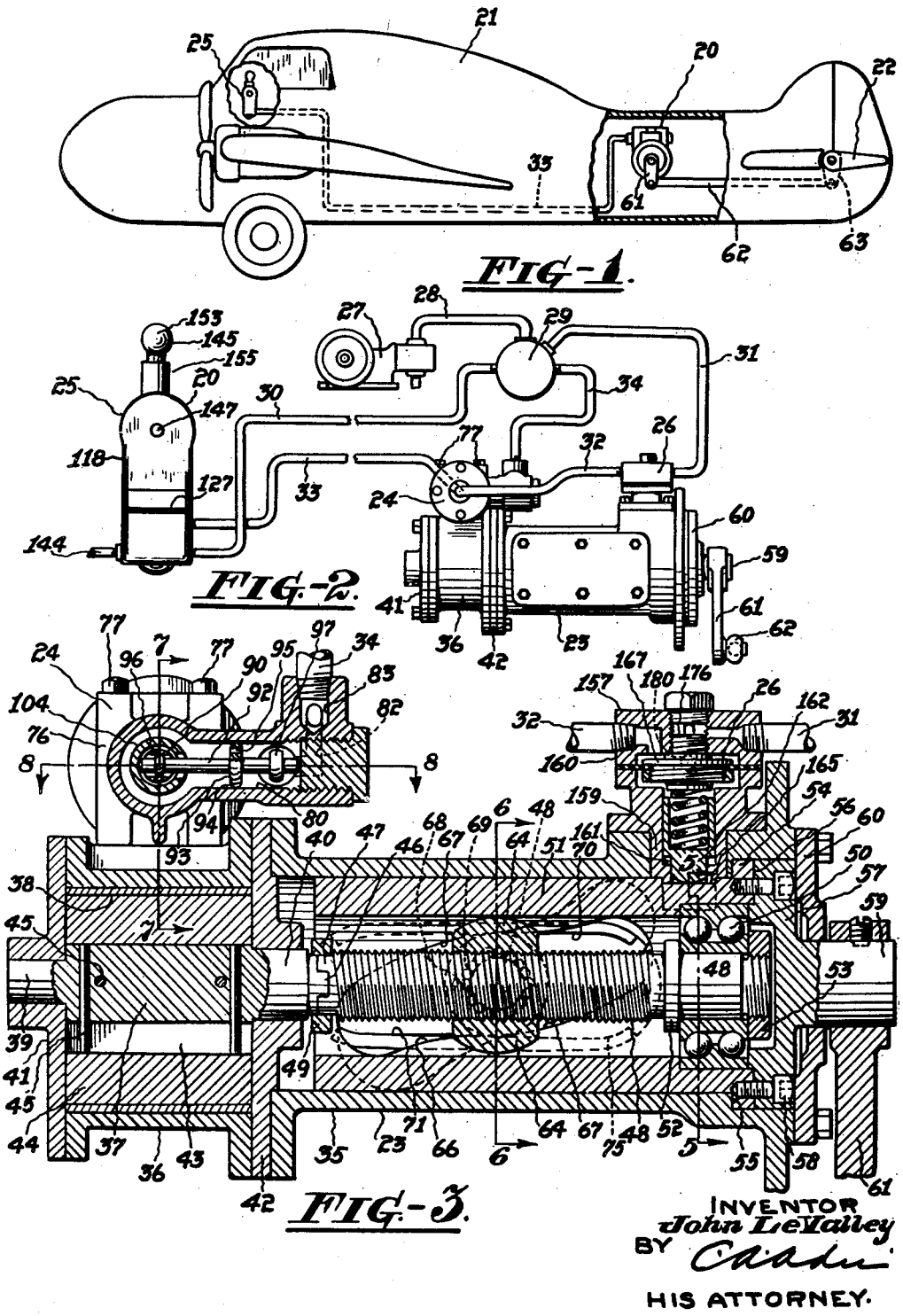
INVENTOR
John LeValley
BY
HIS ATTORNEY.

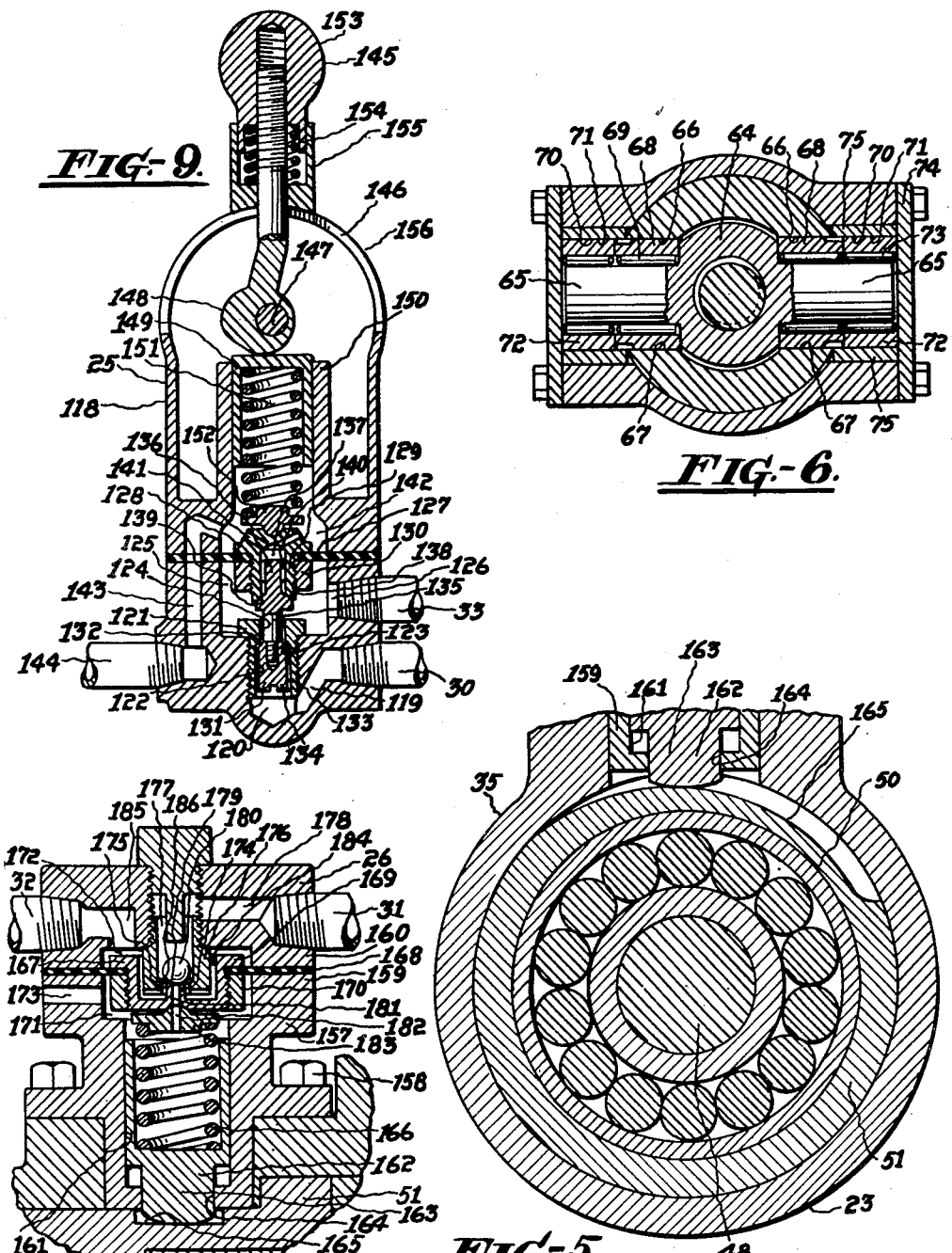

April 11, 1950     J. LE VALLEY     2,503,397
PRESSURE FLUID FOLLOW-UP SERVOMOTOR
Filed June 19, 1945     3 Sheets-Sheet 3

INVENTOR
John LeValley.
BY
HIS ATTORNEY.

Patented Apr. 11, 1950

2,503,397

UNITED STATES PATENT OFFICE 2,503,397

PRESSURE FLUID FOLLOW-UP SERVOMOTOR

John Le Valley, Painted Post, N. Y., assignor to Ingersoll-Rand Company, New York, N. Y., a corporation of New Jersey Application June 19, 1945, Serial No. 600,386

3 Claims. (Cl. 121—41)

This invention relates to controlling devices, and more particularly to a fluid actuated controlling apparatus applicable, for example, to an airplane for tilting its elevators.

It is an object of the invention to provide a powerful and rugged controlling apparatus that is positive and efficient in action and readily responsive to the will of the operator.

Other objects will be in part obvious and in part pointed out hereinafter.

Figure 8:
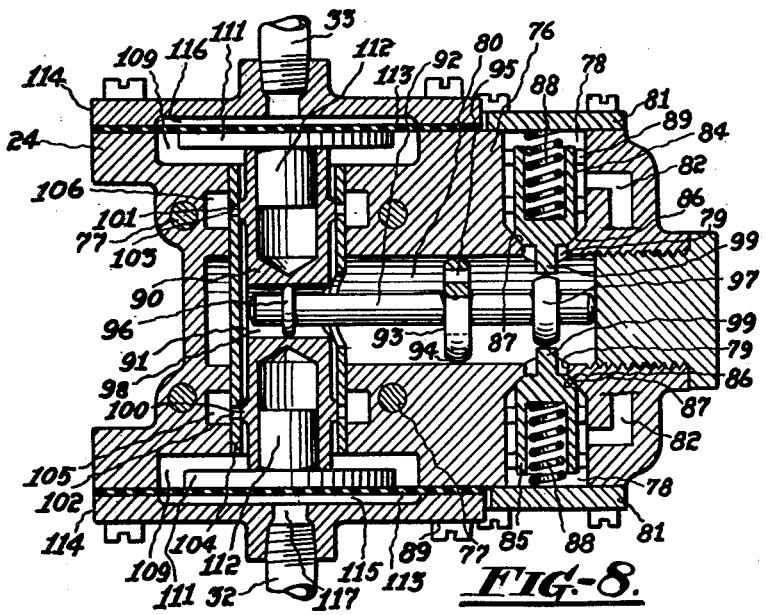
Figure 7:
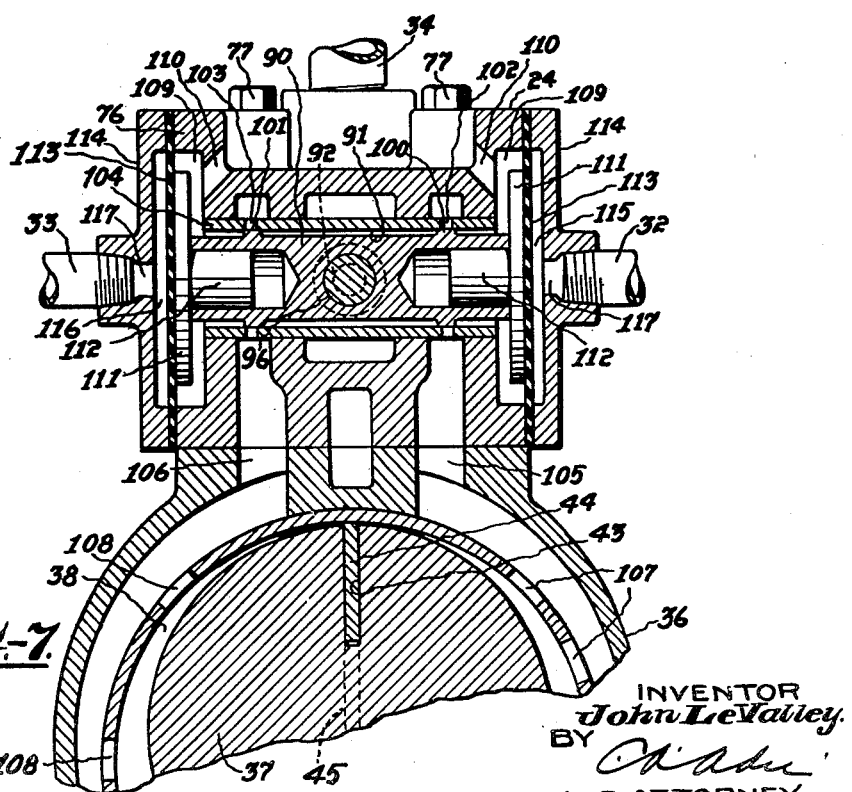

In the drawings accompanying this specification and in which similar reference numerals refer to similar parts, Figure 1 is a side elevation of an airplane equipped with controlling apparatus constructed in accordance with the practice of the invention, Figure 2 is a similar view of the controlling apparatus, Figure 3 is a longitudinal view, in elevation partly broken away, of the power-element of the controlling apparatus, Figure 4 is a similar view, somewhat enlarged, of a valve mechanism controlling the power-element, Figures 5, 6 and 7 are transverse views taken through Figure 3 on the lines 5—5, 6—6, and 7—7, respectively, Figure 8 is a plan view, in section, taken through Figure 3 on the line 8—8, and Figure 9 is an elevation, partly in section, of a valve mechanism intended for manual operation to initiate a cycle of operation of the controlling apparatus.

Referring more particularly to the drawings and at first to Figure 1, 20 designates, in general, a fluid actuated controlling apparatus constructed in accordance with the practice of the invention, and 21 an airplane equipped with the controlling apparatus for tilting the elevators 22.

In the form shown, the controlling apparatus 20 comprises a fluid actuated rotary power-element 23, a fluid actuated valve mechanism 24 for controlling the supply of pressure fluid to and the direction of movement of the power-element, and pilot and rebalancing valve mechanisms 25 and 26, respectively, for controlling the valve mechanism 24.

The fluid medium actuating the controlling apparatus is compressed by a compressor 27 and discharged therefrom through a pipe 28 into a storage receiver 29 having a series of outlet conduits, one of which, designated 30, leads to the pilot valve 25, and another, designated 31, to the rebalancing valve 26, whence pressure fluid flows through a conduit 32 to one side of the valve mechanism 24 for actuating it to one of its controlling positions. The pressure fluid serving to shift the valve mechanism 24 to its other controlling position is conveyed to the opposite side of the valve mechanism by a conduit 33 leading from the pilot valve 25, and a motor line 34 conveys pressure fluid from the storage receiver 29 to the valve mechanism 24 for distribution to the power-element.

The power-element 23 is illustrated as being of a rotary type comprising a casing 35 to an end of which may be attached, in any suitable manner, the casing 36 of a rotary vane type motor containing a rotor 37 that is arranged eccentrically within the rotor chamber 38. The rotor has integral shaft extensions 39 and 40 that are journaled, respectively, in an outer head 41 of the casing 36 and an inner head 42 interposed between the casings 36 and 35. In the rotor are radially extending slots 43 to accommodate vanes 44 against which pressure fluid acts for driving the rotor. The vanes 44 are arranged diametrically opposite each other and push rods 45 slidable transversely of the rotor transmit movement from one vane to another.

The extension 40 extends exteriorly of the head 42 into the casing 35 and has a clutch member 46 in interlocking engagement with a clutch jaw 47 on the adjacent end of a screw 48 extending axially of the casing. This end of the screw 48 is supported only by the shaft extension 40 and is held coaxial therewith by a ring 49 encircling the clutch members of the extension and the screw. The opposite end of the screw 48 extends into an anti-friction bearing 50 in a sleeve 51 arranged within the casing 35. The anti-friction bearing seats at one end against a collar 52 and is held thereagainst by a nut 53 threaded on the end of the screw 48.

The sleeve 51 is rotatable on the inner surface of the casing 35 and has an external flange 54 at the end supporting the anti-friction bearing 50 to abut a shoulder 55 for preventing movement of the sleeve endwise in the direction of the motor. The adjacent end surface of the sleeve 51 serves as a seat 56 for a plate 57 that overlies the end of the sleeve and is secured thereto by screws 58. The plate 57 carries a shaft 59 that extends through a cover 60 on the end of the casing 23 and carries an arm 61 to the free end of which is pivotally connected an end of a rod 62 serving to transmit movement from the arm 61 to the elevator 22 for oscillating it about its pivot, the opposite end of the rod 62 being pivotally connected to an arm 63 on the elevator.

The rotary movement of the motor is imparted to the sleeve 51, at greatly reduced speed, by the screw 48 through a nut 64 having trunnions 65 that extend into inclined, oblong slots 66 in the opposed sides of the sleeve 51. The slots 66 incline in different directions with respect to each other and in a degree particularly suited to assure the desired ratio of speed of the sleeve 51 to motor speed. The opposed surfaces of the slots 66 constitute ways 67 along which sleeves 68 carried by the trunnions 65 ride to rotate the sleeve 51. The sleeves 68 contain rollers 69 to minimize friction between them and the trunnions.

To the end that the nut 64 may be held against rotative movement the trunnions 65 are extended beyond the roller sleeve 68 into slots 70 in the opposed sides of the casing 23. The slots 70 lie in the longitudinal plane of the screw 48 and their opposed surfaces serve as ways 71 for sleeves 72 rotatable on the trunnions and containing rollers 73 to engage the trunnions.

The outer sides of the slots 70 are sealed by cover plate 74, and renewable wearing plates 75 are placed in the opposed sides of the slots for guiding the sleeves 72.

As has been previously indicated, the valve mechanism 24 controls the admission of pressure fluid to the rotary motor and also the direction of rotation thereof. Its casing 76 is secured to the motor by bolts 77 and has a pair of opposed valve chambers 78 in one end thereof that communicate, through ports 79, with a bore 80 extending longitudinally of the casing 76. The outer ends of the chambers 78 are sealed by plates 81, and supply passages 82 opening into the intermediate portions of the chambers 78 extend through the casing 76 to a recess 83 wherewith the conduit 34 communicates.

Each chamber 78 contains a valve, one being designated 84 and the other 85, to control the flow of pressure fluid from the chamber 78 into the bore 80. The valves are of cup-shape and are provided at their closed ends with bevelled surfaces 86 for sealing engagement with corresponding surfaces 87 at the junctures of the chambers 78 and the ports 79. The valves are held against the seating surfaces 87 by springs 88 extending into the valves and seating against the plates 81.

The valves are shown as being of smaller diameter than the chambers to permit the free flow of pressure fluid along their outer surfaces to the ports 79, and on their outer surfaces are ribs 89 that slide upon the walls of the chambers 78 to hold the valves coaxial with the seating surfaces 87.

The flow of pressure fluid from the bore 80 to the motor is controlled by a valve 90 that also serves to control the movements of the valves 84 and 85. The valve 90 is reciprocable in a chamber 91 and movement is transmitted therefrom to the valves 84 and 85, for unseating them, by a tripper 92 extending axially of the bore 80. The tripper 92 is in the form of a rod having a flange 93 intermediate its ends to serve as a pivot point for the tripper. The peripheral surface 94 of the flange 93 is of spherical shape and has a free running fit on the surface of the bore 80 to permit of oscillatory movement of the tripper, and in the flange 93 are ports 95 to permit the flow of pressure fluid through the bore to the valve chamber 91.

The tripper is further provided, near its ends, with flanges 96 and 97 for engagement, respectively, with the valve 90 and the valves 84 and 85. The flange 96 lies within a bore 98 extending transversely of the valve and its surface is rounded in the manner of the flange 93 to minimize friction between the tripper and the valve 90.

The peripheral surface of the flange 97 is also rounded for point engagement with projections 99 on the valves 84 and 85 extending through the ports 79 into the bore 80. The flange 97 is of smaller diameter than the distance between the inner or free ends of the projections 99 to avoid contact between these parts in the neutral position of the tripper.

The valve 90 is of the spool type having a pair of external flanges 100 and 101 for controlling communication between the valve chamber 91 and ports 102 and 103 in the wall of a bushing 104 defining the valve chamber 91. The ports 102 and 103 open into passages 105 and 106 that extend part way around the opposed sides of the inner surface of the casing 36 and communicate with the opposite sides of the point of minimum clearance between the rotor 37 and the wall of the chamber 38 through ports 107 and 108. Owing to this arrangement, these ports and passages may also serve to convey exhaust fluid from the motor, such exhaust passing from the ports 102 and 103 through the ends of the bushing 104 into recesses 109 in the casing 76 adjacent the ends of the valve chamber 91, whence it may flow to the atmosphere through ports 110.

The recesses 109 are of cylindrical shape and, in addition to forming portions of the pathways followed by the fluid exhausting from the motor, serve as chambers for the accommodation of diaphragm heads 111 of equal effective areas having stems 112 seated in the ends of the valve 90. The outer ends of the heads 111 constitute seating surfaces for flexible diaphragms 113 that are clamped at their marginal portions against the casing 76 by plates 114. Each plate 114 is recessed in the side confronting the diaphragm to provide pressure chambers 115 and 116 which communicate, respectively, with the conduits 32 and 33 through ports 117.

The flow of pressure fluid through the conduit 33 to and from the valve mechanism 24 is controlled by the pilot valve 25 which is shown located in the cockpit of the plane 21 and comprises a body 118 to the lower portion of which are connected the conduits 30 and 33. The conduit 30 opens into a passage 119 leading to a recess 120 in the body, and in the roof of the recess is a hollow plug 121 the interior of which serves as a valve chamber 122. At the upper end of the valve chamber 122 is a bevelled seating surface 123 and a port 124 extends therefrom to the upper end of the plug to convey pressure fluid from the chamber 122 to a pressure chamber 125 communicating with the conduit 33 through a port 126.

At its upper end, the chamber 125 is sealed by a flexible diaphragm 127 shown secured in position by upper and lower sections of the body 118 engaging its outer zone. The diaphragm is of annular shape and its inner marginal portion is clamped between a flange 128 of a valve guide 129 and a nut 130 threaded on a portion of the valve guide extending downwardly through the diaphragm. Being supported in this manner, the valve guide is capable of axial movement and will move thus in response to variations of pressure in the chamber 125.

The admission of pressure fluid into the chamber 125 is controlled by a valve 131 in the valve chamber 122 having a bevelled surface 132 for sealing engagement with the surface 123. The valve 131 is reciprocable in the chamber 122 and in its periphery are longitudinally extending grooves 133 for the passage of pressure fluid from the recess 120 to the port 124. The end of the valve 131 confronting the recess 120 constitutes a pressure surface 134 and is constantly subjected to pressure fluid tending to press the valve against the seating surface 123.

On the upper end of the valve 131 is a stem 135 that extends through the port 124 and is connected to a valve 136 in the bore 137. The valve 136 serves both as relief and exhaust valve for the chamber 125 and has a bevelled surface 138 to seat against a similar surface 139 at the lower end of the bore 137, and in the surface of that portion of the valve 136 which lies within the bore 137 are grooves 140 for the passage of fluid from the chamber 125 into the upper portion of the bore 137. This end of the bore is vented through ports 141 opening into a cavity 142 above the diaphragm 127, and an exhaust passage 143 in the body affords communication between the cavity 142 and an exhaust pipe 144 which may open into the atmosphere, as shown, or lead to the inlet side of the compressor 27.

From the foregoing description it will be seen that the valves 131 and 136 move in unison, that movement of the valves in an upwardly direction is limited by the seating surface 123 and that when the valves occupy their uppermost limiting positions the exhaust of fluid from the chamber 125 may be effected only when the valve guide 129 is lifted off of the surface 138 of the valve 136 by the pressure fluid in the chamber 125. In order, therefore, to resist such movement of the valve guide at all pressures below that which it is intended to maintain in the chambers 125 and 116, the pilot valve is provided with means for biasing the valve guide to a depressed position for maintaining the bevelled surfaces 138 and 139 in sealing relation with each other and also to unseat the valve 131 for admitting pressure fluid into the chamber 125.

Such biasing of the diaphragm is effected manually by means of a lever 145 extending through a slot 146 in the upper end of the body 118 and having its lower end pivoted upon a pin 147 seated in the body. On this end of the lever is a spiral cam surface 148 that bears upon the upper end of a piston 149 slidable vertically in a cylinder 150 in the body 118. The piston 149 is hollow, and a spring 151 extending thereinto acts at one end against the piston and at its other end against a spring seat 152 resting upon the valve guide 129.

The lever is provided with a suitable grip member 153 having a depending skirt portion 154 to guide a spring-pressed shoe 155 that frictionally engages the outer curved surface 156 at the upper end of the body 118 to hold the lever against unauthorized movement, and, if desired, suitable indicia, such as lines or numerals (not shown), may be placed on the curved surface 156 and on the shoe 155 to indicate the positions in which the lever must be placed in order to effect desired degrees of angular adjustment of the elevator 22.

The rebalancing valve 26, whose function it is to valve pressure fluid to the valve mechanism 24 for effecting reverse operation of the rotor 37 and the parts operatively connected thereto, is mechanically actuated and moves responsively to the rotary movement of the sleeve 51. Its casing 157 is secured to the side of the casing 35, by bolts 158, and consists of two sections 159 and 160. The section 159 is partly embedded in the wall of the casing 35 and has a bore 161 to accommodate a cam follower 162 which has a stem 163 extending through an aperture 164 at the inner end of the bore 161 for engagement with a spiral cam surface 165 in the periphery of the sleeve 51.

The cam follower 162 is held against the cam surface 165 by a spring 166 interposed between the cam follower and a body 167 supported by a flexible diaphragm 168 having its outer marginal portion clamped between the casing sections 159 and 160. The body 167 is of cup-shape and extends through the diaphragm 168. It has a flange 169 to overlie the diaphragm, and the portion of the body below the flange 169 is threaded externally to accommodate a nut 170 that seats against the diaphragm to clamp the body thereto.

The recesses 171 and 172 in the opposed surfaces of the casing sections 159 and 160 wherein the body 167 is arranged are suitably dimensioned to permit of free endwise movement of the body, and the recess 171 is in constant communication with the atmosphere through a port 173 in the casing section 159.

On the bottom of the member 167 is a stem 174 that extends upwardly through a port 175 in the end of a plug 176 threaded into the roof of the recess 172 and having a bore 177 that communicates with the conduit 31 through a passage 178 in the casing section 160. On the free end of the stem 174 is a valve seat 179 to accommodate a valve 180 of ball-shape that serves, among other functions, to control a passage 181 in the stem 174 and the bottom of the cup-shaped member and opens into a passage 182 in a spring seat 183 interposed between the spring 166 and the body 167.

The stem 174 is of smaller diameter than the port 175 to permit the flow of pressure fluid through said port, and suitable clearance 184 exists between the plug 176 and the body to permit the free flow of pressure fluid into the recess 172 and through a passage 185 to the conduit 32.

The valve 180 controls the port 181 and also controls communication between the bore 177 and the port 175, there being a bevelled seating surface 186 at the juncture of the bore 177 and the port 175 for the valve which may seat upon the surface 179, to close the port 181, or upon the seat 186 to cut-off the flow of pressure fluid through the port 175, depending upon the position of the body 167 with respect to the plug 176.

In the operation of the device, whenever it is intended to cause the plane 21 to climb to a higher elevation the lever 145 is moved to the position corresponding with a desired angular setting of the elevator 22, as for example the mid-position shown in Figures 1, 2 and 9 of the drawings, to bring an intermediate point of the cam 148 into engagement with the piston 149. The piston is thereby depressed and this movement transmitted through the spring 151, the valve guide 129 and the valve 136 unseats the valve 131. Pressure fluid will then flow from the recess 120 into and through the chamber 125 and the conduit 33 to the pressure chamber 116 and move the valve 90 toward the pressure chamber 115.

In this position of the valve the ports 103 are uncovered and the passage 106 is in communication with the atmosphere through the left hand end of the valve chamber 91 and the associated passages, and the ports 102 establish communication between the passage 105 and the portion of the valve chamber lying between the flanges 100 and 101.

During the shifting of the valve 90, to the position described, the tripper 92 is tilted and the flange 97 will unseat the valve 84. Pressure fluid then flows from supply to the right hand side of the motor and rotates it in a clockwise direction, as the power-element is viewed from the motor end in Figure 3 of the drawings. The screw 48, being clutched to the rotor, will rotate in the same direction and cause the nut 64 to move toward the rotor and thus rotate the sleeve 51 also in a clockwise direction and tilt the elevator upwardly to the angle corresponding to the position of the lever 145.

The rotational movement of the sleeve 51 in the direction described will cause the cam surface 165 to thrust the follower 162 outwardly, and this movement of the follower, transmitted through the spring 166, will cause the stem 174 to raise the ball valve 180 off of the seating surface 186. The valve 180 will be held against the seating surface 179 by the pressure fluid in the bore 177 to seal the port 181, and pressure fluid will flow through the port 175, the clearance 184, recess 172, the passage 185 and the conduit 32 into the pressure chamber 115.

Like the pressure existing in the chamber 116, the pressure in the chamber 115 corresponds to the position of the elevator, and since the opposed actuating areas of the valves subjected to pressure fluid for shifting it are of equal areas the valve 90 is moved to the mid-position wherein its flanges 100 and 101 again blank off the ports 102 and 103. The tripper 92 will then also occupy a neutral position and be out of engagement with the valve 84 which will then return to the seating surface 97 and cut-off the flow of pressure fluid into the bore 80.

In these positions of the parts, the valve mechanism 24 will be conditioned for movement in the direction required to effect operation of the motor, and when the plane reaches the desired elevation it may be leveled-off by moving the lever 145 to a position wherein the low point of the cam 148 rests upon the piston 149, thereby releasing the pressure of the spring 151 from the diaphragm. The pressure fluid in the chamber 125 will then lift the valve guide off of the valve 136 and escape, together with that in the chamber 116, through the bore 137, the ports 141, the cavity 142 and the passage 143 to the exhaust pipe 144.

Upon release of the pressure from the chamber 116 the pressure fluid in the chamber 115 will shift the valve 90 leftward (Figure 7) and uncover the ports 102 and 103. At the same time the valve 90 will tilt the tripper 92 and cause it to unseat the valve 85 to admit pressure fluid into the bore 80 and the valve chamber 91. Pressure fluid will then flow from said valve chamber through the ports 103 into the passage 106 and through the ports 108 into the chamber 38 for driving the rotor 37 and the screw 48 in a counter-clockwise direction, the ports 102 then being uncovered to establish communication between the opposite side of the motor and the atmosphere.

This movement of the screw causes the nut 64 to move away from the motor and the sleeve 51 to move in a counter-clockwise direction, thereby transmitting movement through the arms 61, 63 and the rod 62 to tilt the elevator 22 back to its neutral position.

During the rotation of the sleeve 51 the cam follower 162 will again descend and when it rests upon the low spot of the cam surface 165 the pressure on the spring 166 will be relieved. The pressure fluid in the recess 172, acting against the body 167 and the diaphragm, will then press these parts downwardly into the recess 171, thereby lowering the valve 180 to the seating surface 186 and cutting off the further flow of pressure fluid to the pressure chamber 115. When the body 167 has been sufficiently depressed to remove its valve seat 179 from the ball valve 180 the pressure fluid in the recess and associated passages and chambers, will exhaust through the ports in the stem 174 and the spring seat 183, the bore 161, the recess 171 and the port 173 to the atmosphere. When the pressure is thus released from the chamber 115 the spring 88 of the valve 85 will return said valve to its seat 87 and move the tripper 92 and the valve 90 again to neutral positions.

As will be readily understood, any desired inclination of climb for the plane 21 may be attained by placing the lever 145 in a position corresponding to the required angular setting of the elevator, and the plane will continue to climb as long as the lever 145 remains in such position, even though the valve mechanism 24 has been conditioned, by operation of the rebalancing valve mechanism 26, for effecting reverse operation of the power-element. Such reversal of the power-element will only take place when pressure fluid is exhausted from the chamber 116. The pressure fluid in the chamber 115 will then shift the valve 90 to cause the rotor 37 to rotate in the opposite direction for returning the elevator to its initial position.

It will, moreover, be apparent that the angular position that the elevator 22 will assume depends upon the value of the pressure fluid existing in the chamber 116, as determined by the spring 151. Obviously, if the spring 151 is compressed only slightly, a correspondingly light pressure is required in the chamber 125 to reach a value which, if exceeded ever so slightly, will elevate the valve guide 129 and permit the escape of pressure fluid through the bore 137 to the atmosphere and to permit the valve 131 to simultaneously cut-off the flow of pressure fluid into the chamber 125.

Thus, only a pressure of a comparatively low value will exist in the pressure chamber 116 and a pressure of only the same low value is required in the chamber 115 to restore the valve 90 to its neutral position, and this pressure is attained in the chamber 115 with only a small degree of rotative movement of the cam surface 165 and a correspondingly small degree of compression of the spring 166 to effect the valving of a balancing pressure into the recess 172.

The pressures in the chamber 125 and in the recess 172 and, therefore, in the chambers 116 and 115 may be sensitively maintained, since the pressure fluid controlling elements of both operate in such wise that only a very slight unbalance of pressures acting against the opposed sides of the diaphragms 127—168 is required to effect either the valving of pressure fluid into the chamber 125 and the recess 172 or to bleed pressure fluid therefrom.

I claim:

1. A fluid actuated controlling apparatus, comprising a reversible fluid actuated motor, a conduit for conveying pressure fluid to the motor, a power take-off, fluid actuated valve means having opposed actuating surfaces subjected to pressure fluid for valving pressure fluid to the motor, manually operable means for valving pressure fluid to and from the valve means to act against the actuating surfaces to shift the valve means for selectively causing the motor and the power take-off to operate in either direction and being movable to positions corresponding to predetermined positions of the power take-off, means moving responsively to movement of the power take-off to valve pressure fluid to the valve means to act against the actuating surfaces to shift the valve means for causing the motor to stop whenever the power take-off reaches a position corresponding to the position of the manually operable means, and valve means operated by the first mentioned valve means for cutting off the flow of pressure fluid in the conduit when the first mentioned valve means reaches a neutral position.

2. A fluid actuated controlling apparatus, comprising a fluid actuated motor, fluid actuated valve means for valving pressure fluid to the motor having opposed actuating surfaces of equal areas, a conduit for conveying pressure fluid to the motor, manually operable means for valving pressure fluid to one actuating surface for actuating the valve mechanism to admit pressure fluid from the conduit to the motor and being movable to different positions for predetermining the pressure value of the fluid acting against said one actuating surface, means acting responsively to the movement of the motor for subjecting the other actuating surface to pressure fluid of the same pressure value as said one actuating surface for positioning the valve mechanism to cut-off the flow of pressure fluid to the motor, and valve means operated by the first said valve means for cutting off the flow of pressure fluid in the conduit when the first said valve means reaches a neutral position.

3. A fluid actuated controlling apparatus, comprising a member intended to be actuated, a fluid actuated reversible power device for adjusting the member to different positions, a conduit for conveying pressure fluid to the motor, fluid actuated valve means having opposed actuating surfaces for controlling the admission of pressure fluid to and the direction of movement of the power device, manually operable means for valving pressure fluid to the valve means to shift said valve means for causing operation of the power device for moving the member and being shiftable to different positions each determining the pressure value of the fluid valved to the valve means and corresponding to a predetermined position of the member, means acting responsively to the movement of the power device for automatically effecting the subjection of the valve means to pressure fluid of a value equal to such pressure value whenever the member reaches said predetermined position for shifting the valve means to cut-off the flow of pressure fluid to the power device, irrespective of the pressure value of the fluid valved to the valve means by the manually operable means, and valve means operated by the first said valve means for cutting off the flow of pressure fluid in the conduit when the first said valve means reaches a neutral position.

JOHN LE VALLEY.

REFERENCES CITED

The following references are of record in the file of this patent:

UNITED STATES PATENTS

| Number | Name | Date |
|---|---|---|
| 871,157 | Andrews | Nov. 19, 1907 |
| 1,999,834 | Ernst | Apr. 30, 1935 |
| 2,062,089 | Eaton | Nov. 24, 1936 |
| 2,177,098 | Doe | Oct. 24, 1939 |
| 2,229,561 | Galanot | Jan. 21, 1941 |
| 2,243,656 | Shannon | May 27, 1941 |
| 2,243,781 | Thornhill | May 27, 1941 |
| 2,401,680 | Eaton | June 4, 1946 |

FOREIGN PATENTS

| Number | Country | Date |
|---|---|---|
| 459,893 | Great Britain | Jan. 18, 1937 |